(12) United States Patent
Wu et al.

(10) Patent No.: US 11,251,848 B2
(45) Date of Patent: Feb. 15, 2022

(54) TRANSMITTING A BEAM RECOVERY REQUEST

(71) Applicant: Motorola Mobility LLC, Chicago, IL (US)

(72) Inventors: Lianhai Wu, Beijing (CN); Chenxi Zhu, Beijing (CN); Zhennian Sun, Beijing (CN); Haiming Wang, Beijing (CN); Xiaodong Yu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 59 days.

(21) Appl. No.: 16/623,082

(22) PCT Filed: Jun. 15, 2017

(86) PCT No.: PCT/CN2017/088407
§ 371 (c)(1),
(2) Date: Dec. 16, 2019

(87) PCT Pub. No.: WO2018/227464
PCT Pub. Date: Dec. 20, 2018

(65) Prior Publication Data
US 2020/0186218 A1    Jun. 11, 2020

(51) Int. Cl.
*H04B 7/06* (2006.01)
*H04L 5/00* (2006.01)
*H04W 72/04* (2009.01)
*H04W 74/08* (2009.01)

(52) U.S. Cl.
CPC ......... *H04B 7/0617* (2013.01); *H04B 7/0623* (2013.01); *H04B 7/0626* (2013.01);
(Continued)

(58) Field of Classification Search
CPC .. H04B 17/318; H04B 7/0408; H04B 7/0619; H04B 7/0623; H04B 7/0626;
(Continued)

(56) References Cited

U.S. PATENT DOCUMENTS

2011/0080825 A1    4/2011    Dimou et al.
2016/0183233 A1    6/2016    Park
(Continued)

FOREIGN PATENT DOCUMENTS

WO    2017024516 A1    2/2017

OTHER PUBLICATIONS

PCT/CN2017/088407, Notification of Transmittal of the International Search Report and the Written Opinion of the International Searching Authority, or the Declaration, dated Mar. 19, 2018, pp. 1-9.

(Continued)

*Primary Examiner* — Michael Thier
*Assistant Examiner* — Prince A Mensah
(74) *Attorney, Agent, or Firm* — Kunzler Bean & Adamson (57) ABSTRACT

Apparatuses, methods, and systems are disclosed for transmitting a beam recovery request. One apparatus (200) includes a receiver (212) that receives (402) information indicating a resource configured for a beam recovery request. The apparatus (200) includes a transmitter (210) that transmits (404) the beam recovery request on the resource in response to a first trigger condition.

19 Claims, 5 Drawing Sheets

(52) U.S. Cl.
CPC ......... *H04B 7/0632* (2013.01); *H04L 5/0048* (2013.01); *H04W 72/0413* (2013.01); *H04W 74/0833* (2013.01)

(58) Field of Classification Search
CPC ............... H04B 7/0632; H04B 7/0645; H04W 72/0413; H04W 72/0453; H04W 72/046; H04W 74/0833; H04W 76/19; H04L 5/0048; H04L 5/0053; H04L 5/0094
See application file for complete search history.

(56) References Cited

U.S. PATENT DOCUMENTS

| | | | |
|---|---|---|---|
| 2018/0138962 A1* | 5/2018 | Islam | H04L 5/0032 |
| 2018/0234960 A1* | 8/2018 | Nagaraja | H04B 17/318 |
| 2018/0278310 A1* | 9/2018 | Lee | H04B 7/0645 |
| 2018/0278467 A1* | 9/2018 | Wilson | H04W 72/046 |
| 2018/0323855 A1* | 11/2018 | Noh | H04B 7/0408 |
| 2018/0368126 A1* | 12/2018 | Islam | H04L 5/0048 |
| 2020/0052770 A1* | 2/2020 | Chen | H04B 7/0619 |
| 2020/0092785 A1* | 3/2020 | Yang | H04W 76/19 |
| 2020/0275514 A1* | 8/2020 | Takahashi | H04W 72/0453 |

OTHER PUBLICATIONS

Samsung, "NR beam recovery", 3GPP TSG-RAN WG2 2017 RAN2#98 Meeting R2-1705731, May 15-19, 2017, pp. 1-5.
Samsung, "NR beam recovery procedure", 3GPP TSG-RAN WG2 2017 RAN2#97bis Meeting R2-1703712, Apr. 3-7, 2017, pp. 1-6.

\* cited by examiner

TRANSMITTING A BEAM RECOVERY REQUEST

FIELD

The subject matter disclosed herein relates generally to wireless communications and more particularly relates to transmitting a beam recovery request.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a beam quality may be degraded. In such configurations, a beam recovery may need to occur.

BRIEF SUMMARY

Apparatuses for transmitting a beam recovery request are disclosed. Methods and systems also perform the functions of the apparatus. In one embodiment, the apparatus includes a receiver that receives information indicating a resource configured for a beam recovery request. In some embodiments, the apparatus includes a transmitter that transmits the beam recovery request on the resource in response to a first trigger condition.

In one embodiment, the first trigger condition includes a medium access control layer receiving a number of out-of-sync indications from a physical layer. In a further embodiment, the number of out-of-sync indications is configured by radio resource control signaling. In certain embodiments, the resource configured for the beam recovery request is configured by radio resource control signaling. In various embodiments, the resource configured for the beam recovery request is enabled for use in response to the resource being configured by the radio resource control signaling. In some embodiments, the resource configured for the beam recovery request is enabled for use in response to the resource being activated by a medium access control control element.

In certain embodiments, the apparatus includes a processor that selects a first available resource to transmit the beam recovery request in response to a contention-free resource and a physical uplink control channel resource being available for transmission of the beam recovery request. In some embodiments, the apparatus includes a processor that selects a physical uplink control channel resource to transmit the beam recovery request in response to a contention-free resource and the physical uplink control channel resource being available for transmission of the beam recovery request and in response to the physical uplink control channel resource having a channel quality greater than a predetermined threshold. In various embodiments, the apparatus includes a processor that selects a physical random access channel resource to transmit the beam recovery request in response to the physical uplink control channel resource having the channel quality less than the predetermined threshold.

In one embodiment, the apparatus includes a processor that monitors for a response to transmission of the beam recovery request for a predetermined time in response to transmitting the beam recovery request using a physical random access channel resource and skips a physical uplink control channel resource for the beam recovery request during the predetermined time. In certain embodiments, the apparatus includes a processor that skips a physical random access channel resource for the beam recovery request in response to transmitting the beam recovery request using a physical uplink control channel resource. In some embodiments, the apparatus includes a processor that selects a contention based resource to transmit the beam recovery request in response to a contention-free resource and a physical uplink control channel resource being unavailable for transmission of the beam recovery request. In various embodiments, the apparatus includes a processor that selects the resource to transmit the beam recovery request based on a measurement result and an association between a downlink transmission beam and a physical uplink control channel resource.

In some embodiments, the association between the downlink transmission beam and the physical uplink control channel resource is configured by radio resource control signaling. In certain embodiments, the measurement result is based on a channel state information reference signal in response to the channel state information reference signal being configured by a base unit. In various embodiments, the measurement result is based on a synchronization signal block in response to a channel state information reference signal not being configured by a base unit. In one embodiment, the apparatus includes a processor that performs a beam measurement to determine the measurement result in response to a second trigger condition. In some embodiments, the second trigger condition includes a quality of a serving beam being less than a predetermined threshold, a number of out-of-sync indications from a physical layer, or some combination thereof. In certain embodiments, the predetermined threshold and the number are configured by radio resource control signaling. In various embodiments, the apparatus includes a processor that starts a timer in response to the first trigger condition. In various embodiments, the processor enters radio link failure in response to the timer expiring. In one embodiment, the processor stops the timer in response to receiving a response to the transmission of the beam recovery request.

A method for transmitting a beam recovery request, in one embodiment, includes receiving information indicating a resource configured for a beam recovery request. In some embodiments, the method includes transmitting the beam recovery request on the resource in response to a first trigger condition.

In one embodiment, an apparatus for receiving a beam recovery request includes a transmitter that transmits information indicating a resource configured for a beam recovery request. In some embodiments, the apparatus includes a receiver that receives the beam recovery request on the resource.

In certain embodiments, the resource configured for the beam recovery request is configured by radio resource control signaling. In various embodiments, the resource configured for the beam recovery request is enabled for use in response to the resource being configured by the radio resource control signaling. In some embodiments, the resource configured for the beam recovery request is enabled for use in response to the resource being activated by a medium access control control element.

In certain embodiments, a first available resource is selected to transmit the beam recovery request in response to a contention-free resource and a physical uplink control channel resource being available for transmission of the beam recovery request. In some embodiments, a physical uplink control channel resource is selected to transmit the beam recovery request in response to a contention-free resource and the physical uplink control channel resource being available for transmission of the beam recovery request and in response to the physical uplink control channel resource having a channel quality greater than a predetermined threshold. In various embodiments, a physical random access channel resource is selected to transmit the beam recovery request in response to the physical uplink control channel resource having the channel quality less than the predetermined threshold.

In one embodiment, the transmitter transmits a response to the beam recovery request. In certain embodiments, a physical random access channel resource for the beam recovery request is skipped in response to the beam recovery request being transmitting using a physical uplink control channel resource. In some embodiments, a contention based resource is selected to transmit the beam recovery request in response to a contention-free resource and a physical uplink control channel resource being unavailable for transmission of the beam recovery request.

In various embodiments, the resource to transmit the beam recovery request is selected based on a measurement result and an association between a downlink transmission beam and a physical uplink control channel resource. In certain embodiments, the association between the downlink transmission beam and the physical uplink control channel resource is configured by radio resource control signaling. In some embodiments, the measurement result is based on a channel state information reference signal in response to the channel state information reference signal being configured by a base unit. In one embodiment, the measurement result is based on a synchronization signal block in response to a channel state information reference signal not being configured by a base unit.

In various embodiments, a beam measurement is performed to determine the measurement result in response to a second trigger condition. In certain embodiments, the second trigger condition includes a quality of a serving beam being less than a predetermined threshold, a number of out-of-sync indications from a physical layer, or some combination thereof. In some embodiments, the predetermined threshold and the number are configured by radio resource control signaling. In one embodiment, a timer is started in response to the first trigger condition. In various embodiments, radio link failure is entered in response to the timer expiring. In certain embodiments, the timer is stopped in response to transmitting a response to receiving the beam recovery request.

A method for receiving a beam recovery request, in one embodiment, includes transmitting information indicating a resource configured for a beam recovery request. In certain embodiments, the method includes receiving the beam recovery request on the resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
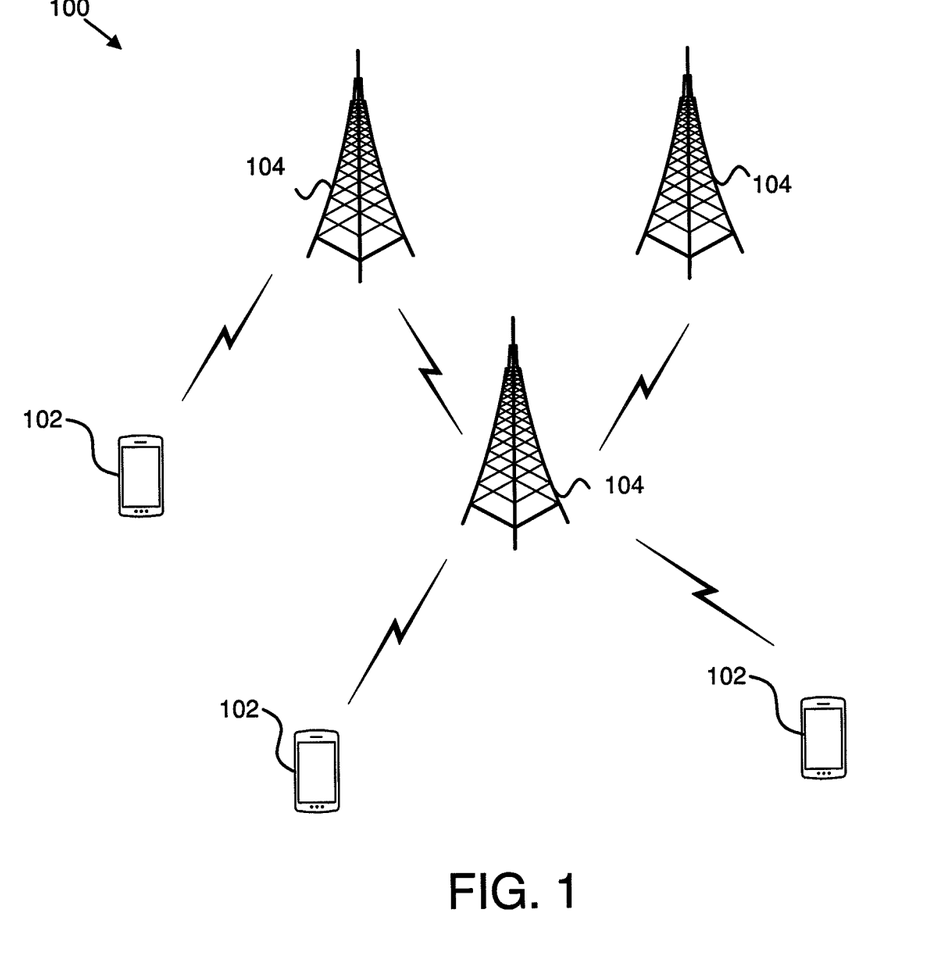
FIG. 1 is a schematic block diagram illustrating one embodiment of a wireless communication system for transmitting and/or receiving a beam recovery request.

FIG. 1 depicts an embodiment of a wireless communication system 100 for transmitting and/or receiving a beam recovery request. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive information indicating a resource configured for a beam recovery request. In some embodiments, the remote unit 102 may transmit the beam recovery request on the resource in response to a first trigger condition. Accordingly, a remote unit 102 may be used for transmitting a beam recovery request.

In certain embodiments, a base unit 104 may transmit information indicating a resource configured for a beam recovery request. In certain embodiments, the base unit 104 may receive the beam recovery request on the resource in response to a first trigger condition. Accordingly, a base unit 104 may be used for receiving a beam recovery request.

Figure 2:
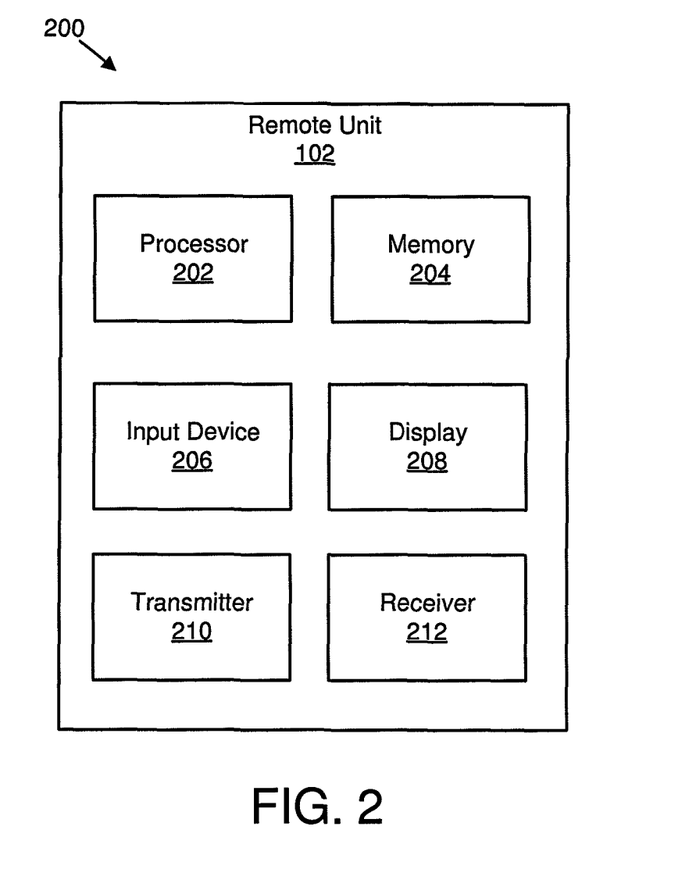
FIG. 2 is a schematic block diagram illustrating one embodiment of an apparatus that may be used for transmitting a beam recovery request.

FIG. 2 depicts one embodiment of an apparatus 200 that may be used for transmitting a beam recovery request. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to beam recovery requests. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the receiver 212 may be used to receive information indicating a resource configured for a beam recovery request. In various embodiments, the transmitter 210 may be used to transmit the beam recovery request on the resource in response to a first trigger condition. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

In some embodiments, transmitting a beam recovery request (e.g., a beam failure recovery procedure) may be performed using various steps that may be performed in any suitable order and/or some steps may not be performed.

In a first step, a base unit 104 may configure a remote unit 102 with various information. In one embodiment, in response to the remote unit 102 being configured with a channel state information reference signal ("CSI-RS"), the information may include that the CSI-RS is used to determine a beam failure. In another embodiment, in response to the remote unit 102 not being configured is a CSI-RS, the information may include that a synchronization signal block ("SS-block") may be used to determine a beam failure. In some embodiments, resources for UL transmission of a beam recovery request may be configured by RRC signaling. In certain embodiments, the information may include a trigger condition to transmit a beam failure recovery request. In various embodiments, the trigger condition may be that a medium access control ("MAC") layer receives a number (e.g., "N") of out-of-sync indications from a physical layer. In one embodiment, the number of out-of-sync indications may be configured by RRC signaling. As used herein, an "out-of-sync indication" may refer to feedback, a response, an indication, and/or a signal that contains information indicating that there is no synchronization between data being received and a device decoding the data being received. In some embodiments, the information may include a trigger condition to identify a candidate DL TX beam. In various embodiments, the trigger condition may include that a serving beam quality becomes worse than a configured and/or predetermined threshold. In certain embodiments, the trigger condition may include that a number ("e.g., "M") of out-of-sync indications are received in a physical layer.

In a second step, the remote unit 102 may report measurement results periodically to the base unit 104. The report measurement results may include results corresponding to a serving beam.

In a third step, the base unit 104 may activate a dedicated UL resource for transmitting a beam recovery request based on the measurement results. In some embodiments, the dedicated UL resource may be activated by a MAC control element ("CE"). In one embodiment, the base unit 104 may configure the dedicated UL resource for the remote unit 102 to transmit the beam recovery request using RRC signaling. In such an embodiment, the remote unit 102 may be enabled to use the dedicated UL resource in response to receiving configuration information indicating the dedicated UL resource. In another embodiment, the remote unit 102 may be enabled to use the dedicated UL resource in response to the base unit 104 activating the dedicated UL resource via the MAC CE.

In a fourth step, an event that triggers a beam failure recovery request may be detected by the remote unit 102. In response to the event triggering the beam failure recovery request for a last active beam, the MAC of the remote unit 102 may start a timer ("T1"). In response to the timer expiring, the remote unit 102 may enter a radio link failure ("RLF") condition. In some embodiments, the timer may stop in response to the remote unit 102 receiving a response to the beam failure recovery request.

In a fifth step, the remote unit 102 may transmit a beam recovery request to the base unit 104. In some embodiments, a base unit 104 may configure an association between a DL TX beam and a PUCCH resource. In certain embodiments, based on a measurement result associated to an SS-block or CSI-RS, only a PUCCH resource associated to a suitable beam may be used for a beam failure recovery request. As used herein, a "suitable beam" may mean that a measurement quality is better than a threshold quality configured by the base unit 104. In some embodiments, in response to a contention-free resource for a beam recovery request being available, the remote unit 102 may use the contention-free resource to transmit beam recovery request. In various embodiments, in response to a PUCCH resource such as scheduling request ("SR"), sounding reference signal ("SRS"), PUSCH, and/or PUCCH for a beam recovery request being available, the remote unit 102 may use a first available PUCCH resource to transmit the beam recovery request.

In certain embodiments, in response to both a contention-free resource and a PUCCH resource for beam recovery request being available, the remote unit 102 may select an UL resource for a beam recovery request based on certain criteria. In one embodiment, the criteria may include the remote unit 102 selecting a first available resource. In some embodiments, the criteria may include the remote unit 102 selecting a PUCCH resource based on a priority in response to a beam including a suitable PUCCH resource. In such embodiments, the criteria may include, in response to all beams associated with the PUCCH resource not being suitable, the remote unit 102 selecting a PRACH resource for transmitting the beam recovery request. As used herein, a beam "not being suitable" may mean that a measurement quality is less than a threshold quality configured by the base unit 104.

In various embodiments, in response to a beam recovery request being transmitted in a first selected resource, the remote unit 102 may handle other available resources according to certain criteria. In one embodiment, the criteria may include the remote unit 102 skipping other available resources for the beam recovery request. For example, in response to the beam recovery request being transmitted in a PRACH resource, the remote unit 102 may monitor for a response within a time window. During the time window, the remote unit 102 may skip a PUCCH resource for a beam recovery request. As another example, in response to the beam recovery request being transmitted in a PUCCH resource, the remote unit 102 may skip a PRACH resource for a beam recovery request. In some embodiments, the criteria may include the remote unit 102 retransmitting the beam recovery request using other available resources. For example, in response to the beam recovery request being transmitted in a PRACH resource, the remote unit 102 may monitor for a response within a time window. During the time window, the remote unit 102 may retransmit the beam recovery request using a PUCCH resource. As another example, in response to the beam recovery request being transmitted in a PUCCH resource, the remote unit 102 may retransmit the beam recovery request using a PRACH resource. In various embodiment, in response to both a contention-free resource and a PUCCH resource for a beam recovery request not being available to the remote unit 102, the remote unit 102 may use a contention based resource to transmit a beam recovery request.

In a sixth step, the base unit 104 may transmit a response to the beam recovery request to the remote unit 102. For example, in response to the base unit 104 receiving the beam recovery request from the remote unit 102, the base unit 104 may transmit the response in a DL beam associated with the UL resource, or in a candidate DL beam signaled in PUCCH.

In a seventh step, the remote unit 102 monitors for a response from the base unit 104 after transmitting the beam recovery request. In response to the remote unit 102 failing to receive a response from the base unit 104 within a predetermined time window, the remote unit 102 may be enabled to transmit a beam recovery request again.

Figure 3:
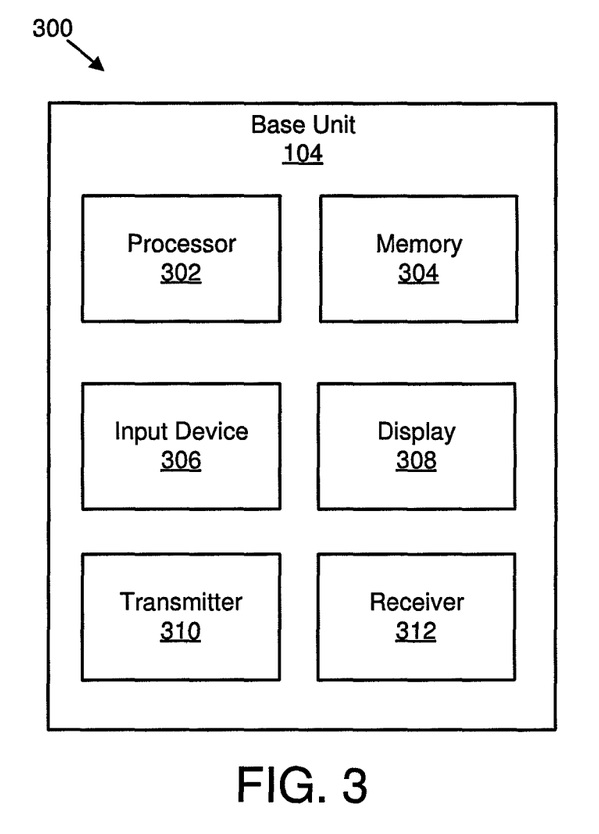
FIG. 3 is a schematic block diagram illustrating one embodiment of an apparatus that may be used for receiving a beam recovery request.

FIG. 3 depicts one embodiment of an apparatus 300 that may be used for receiving a beam recovery request. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may be used to transmit information indicating a resource configured for a beam recovery request. In some embodiments, the receiver 312 may be used to receive the beam recovery request on the resource in response to a first trigger condition. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
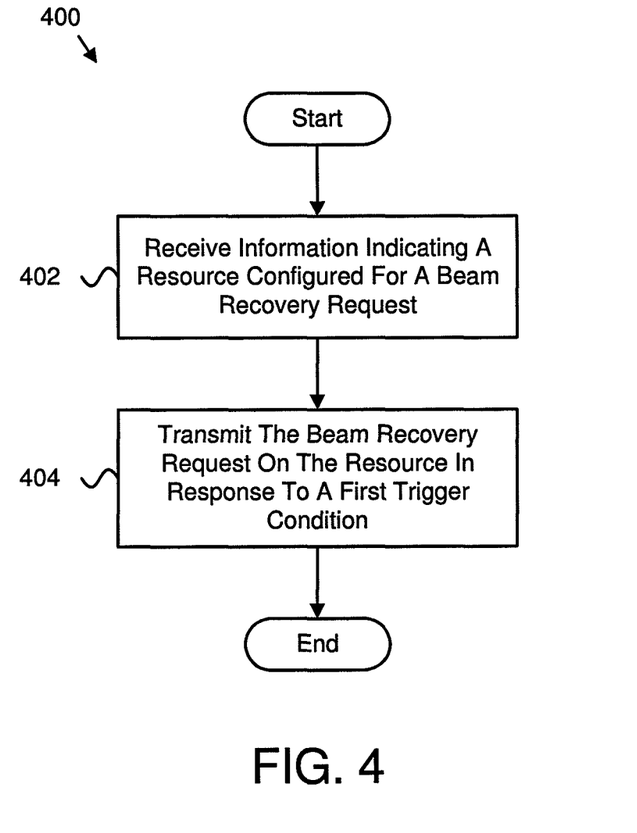
FIG. 4 is a schematic flow chart diagram illustrating one embodiment of a method for transmitting a beam recovery request.

FIG. 4 is a schematic flow chart diagram illustrating one embodiment of a method 400 for transmitting a beam recovery request. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include receiving 402 information indicating a resource configured for a beam recovery request. In some embodiments, the method 400 includes transmitting 404 the beam recovery request on the resource in response to a first trigger condition.

In one embodiment, the first trigger condition includes a medium access control layer receiving a number of out-of-sync indications from a physical layer. In a further embodiment, the number of out-of-sync indications is configured by radio resource control signaling. In certain embodiments, the resource configured for the beam recovery request is configured by radio resource control signaling. In various embodiments, the resource configured for the beam recovery request is enabled for use in response to the resource being configured by the radio resource control signaling. In some embodiments, the resource configured for the beam recovery request is enabled for use in response to the resource being activated by a medium access control control element.

In certain embodiments, the method 400 includes selecting a first available resource to transmit the beam recovery request in response to a contention-free resource and a physical uplink control channel resource being available for transmission of the beam recovery request. In some embodiments, the method 400 includes selecting a physical uplink control channel resource to transmit the beam recovery request in response to a contention-free resource and the physical uplink control channel resource being available for transmission of the beam recovery request and in response to the physical uplink control channel resource having a channel quality greater than a predetermined threshold. In various embodiments, the method 400 includes selecting a physical random access channel resource to transmit the beam recovery request in response to the physical uplink control channel resource having the channel quality less than the predetermined threshold.

In one embodiment, the method 400 includes monitoring for a response to transmission of the beam recovery request for a predetermined time in response to transmitting the beam recovery request using a physical random access channel resource and skipping a physical uplink control channel resource for the beam recovery request during the predetermined time. In certain embodiments, the method 400 includes skipping a physical random access channel resource for the beam recovery request in response to transmitting the beam recovery request using a physical uplink control channel resource. In some embodiments, the method 400 includes selecting a contention based resource to transmit the beam recovery request in response to a contention-free resource and a physical uplink control channel resource being unavailable for transmission of the beam recovery request. In various embodiments, the method 400 includes selecting the resource to transmit the beam recovery request based on a measurement result and an association between a downlink transmission beam and a physical uplink control channel resource.

In some embodiments, the association between the downlink transmission beam and the physical uplink control channel resource is configured by radio resource control signaling. In certain embodiments, the measurement result is based on a channel state information reference signal in response to the channel state information reference signal being configured by a base unit. In various embodiments, the measurement result is based on a synchronization signal block in response to a channel state information reference signal not being configured by a base unit. In one embodiment, the method 400 includes performing a beam measurement to determine the measurement result in response to a second trigger condition. In some embodiments, the second trigger condition includes a quality of a serving beam being less than a predetermined threshold, a number of out-of-sync indications from a physical layer, or some combination thereof. In certain embodiments, the predetermined threshold and the number are configured by radio resource control signaling. In various embodiments, the method 400 includes starting a timer in response to the first trigger condition. In various embodiments, the method 400 enters radio link failure in response to the timer expiring. In one embodiment, the method 400 stops the timer in response to receiving a response to the transmission of the beam recovery request.

Figure 5:
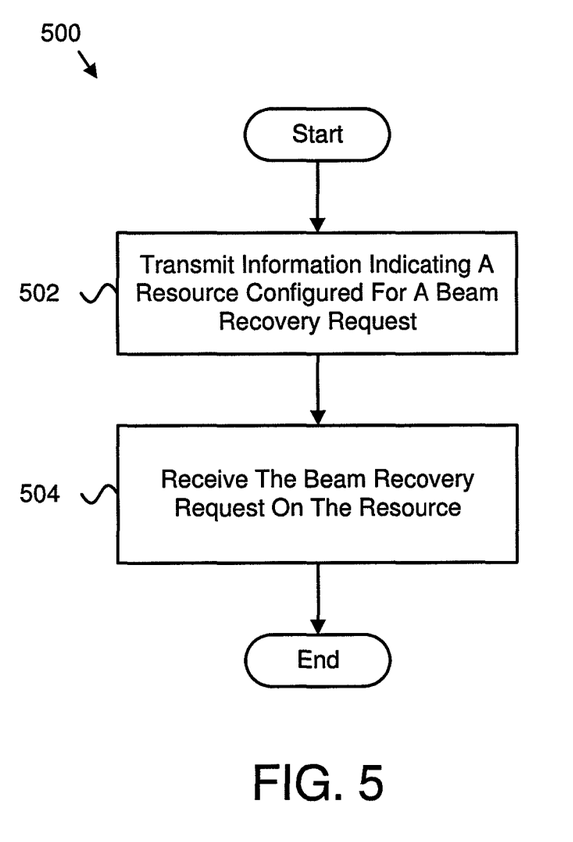
FIG. 5 is a schematic flow chart diagram illustrating one embodiment of a method for receiving a beam recovery request.

FIG. 5 is a schematic flow chart diagram illustrating one embodiment of a method 500 for receiving a beam recovery request. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 information indicating a resource configured for a beam recovery request. In certain embodiments, the method 500 includes receiving 504 the beam recovery request on the resource.

In one embodiment, the first trigger condition includes a medium access control layer receiving a number of out-of-sync indications from a physical layer. In a further embodiment, the number of out-of-sync indications is configured by radio resource control signaling. In certain embodiments, the resource configured for the beam recovery request is configured by radio resource control signaling. In various embodiments, the resource configured for the beam recovery request is enabled for use in response to the resource being configured by the radio resource control signaling. In some embodiments, the resource configured for the beam recovery request is enabled for use in response to the resource being activated by a medium access control control element.

In certain embodiments, a first available resource is selected to transmit the beam recovery request in response to a contention-free resource and a physical uplink control channel resource being available for transmission of the beam recovery request. In some embodiments, a physical uplink control channel resource is selected to transmit the beam recovery request in response to a contention-free resource and the physical uplink control channel resource being available for transmission of the beam recovery request and in response to the physical uplink control channel resource having a channel quality greater than a predetermined threshold. In various embodiments, a physical random access channel resource is selected to transmit the beam recovery request in response to the physical uplink control channel resource having the channel quality less than the predetermined threshold.

In one embodiment, the method 500 includes transmitting a response to the beam recovery request. In certain embodiments, a physical random access channel resource for the beam recovery request is skipped in response to the beam recovery request being transmitting using a physical uplink control channel resource. In some embodiments, a contention based resource is selected to transmit the beam recovery request in response to a contention-free resource and a physical uplink control channel resource being unavailable for transmission of the beam recovery request.

In various embodiments, the resource to transmit the beam recovery request is selected based on a measurement result and an association between a downlink transmission beam and a physical uplink control channel resource. In certain embodiments, the association between the downlink transmission beam and the physical uplink control channel resource is configured by radio resource control signaling. In some embodiments, the measurement result is based on a channel state information reference signal in response to the channel state information reference signal being configured by a base unit. In one embodiment, the measurement result is based on a synchronization signal block in response to a channel state information reference signal not being configured by a base unit.

In various embodiments, a beam measurement is performed to determine the measurement result in response to a second trigger condition. In certain embodiments, the second trigger condition includes a quality of a serving beam being less than a predetermined threshold, a number of out-of-sync indications from a physical layer, or some combination thereof. In some embodiments, the predetermined threshold and the number are configured by radio resource control signaling. In one embodiment, a timer is started in response to the first trigger condition. In various embodiments, radio link failure is entered in response to the timer expiring. In certain embodiments, the timer is stopped in response to transmitting a response to receiving the beam recovery request.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving information indicating a resource configured for a beam recovery request;
   in response to the configured resource being a contention-free resource, selecting a contention based resource as the resource used to transmit the beam recovery request in response to the contention-free resource and a physical uplink control channel resource being unavailable for transmission of the beam recovery request;
   and transmitting the beam recovery request on the resource in response to a first trigger condition.

2. The method of claim 1, wherein the first trigger condition comprises a medium access control layer receiving a number of out-of-sync indications from a physical layer.

3. The method of claim 1, wherein the resource configured for the beam recovery request is configured by radio resource control signaling.

4. The method of claim 3, wherein the resource configured for the beam recovery request is enabled for use in response to the resource being configured by the radio resource control signaling.

5. The method of claim 3, wherein the resource configured for the beam recovery request is enabled for use in response to the resource being activated by a medium access control control element.

6. The method of claim 1, further comprising selecting a first available resource to transmit the beam recovery request in response to the configured resource being the contention-free resource and a physical uplink control channel resource being available for transmission of the beam recovery request.

7. The method of claim 1, further comprising selecting a physical uplink control channel resource to transmit the beam recovery request in response to the configured resource being the contention-free resource and the physical uplink control channel resource being available for transmission of the beam recovery request and in response to the physical uplink control channel resource having a channel quality greater than a predetermined threshold.

8. The method of claim 7, further comprising selecting a physical random access channel resource to transmit the beam recovery request in response to the physical uplink control channel resource having the channel quality less than the predetermined threshold.

9. The method of claim 1, further comprising monitoring for a response to transmission of the beam recovery request for a predetermined time in response to transmitting the beam recovery request using a physical random access channel resource and skipping a physical uplink control channel resource for the beam recovery request during the predetermined time.

10. The method of claim 1, further comprising skipping a physical random access channel resource for the beam recovery request in response to transmitting the beam recovery request using a physical uplink control channel resource.

11. The method of claim 1, further comprising selecting the resource to transmit the beam recovery request based on a measurement result and an association between a downlink transmission beam and a physical uplink control channel resource.

12. The method of claim 11, wherein the association between the downlink transmission beam and the physical uplink control channel resource is configured by radio resource control signaling.

13. The method of claim 11, wherein the measurement result is based on a channel state information reference signal in response to the channel state information reference signal being configured by a base unit.

14. The method of claim 11, wherein the measurement result is based on a synchronization signal block in response to a channel state information reference signal not being configured by a base unit.

15. The method of claim 11, further comprising performing a beam measurement to determine the measurement result in response to a second trigger condition.

16. The method of claim 15, wherein the second trigger condition comprises a quality of a serving beam being less than a predetermined threshold, a number of out-of-sync indications from a physical layer, or some combination thereof.

17. The method of claim 1, further comprising starting a timer in response to the first trigger condition.

18. An apparatus comprising:
   a receiver that receives information indicating a resource configured for a beam recovery request;
   a processor that, in response to the configured resource being a contention-free resource, selects a contention based resource as the resource used to transmit the beam recovery request in response to the contention-free resource and a physical uplink control channel resource being unavailable for transmission of the beam recovery request;
   and a transmitter that transmits the beam recovery request on the resource in response to a first trigger condition.

19. An apparatus comprising:
   a transmitter that transmits information indicating a resource configured for a beam recovery request;
   and a receiver that receives the beam recovery request on the resource, wherein, in response to the configured resource being a contention-free resource, a contention based resource is the resource on which the beam recovery request is received in response to the contention-free resource and a physical uplink control channel resource being unavailable for reception of the beam recovery request.

* * * * *